Dec. 19, 1933.  M. J. JOHNSON  1,940,595
GAME NET SUPPORT
Filed Aug. 22, 1931
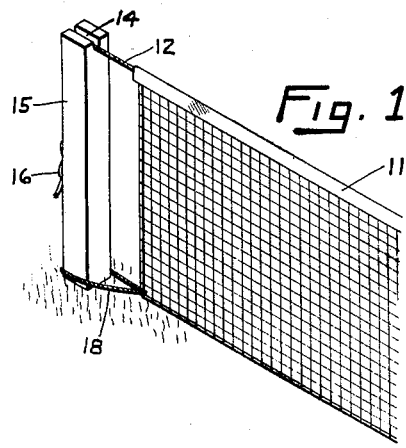
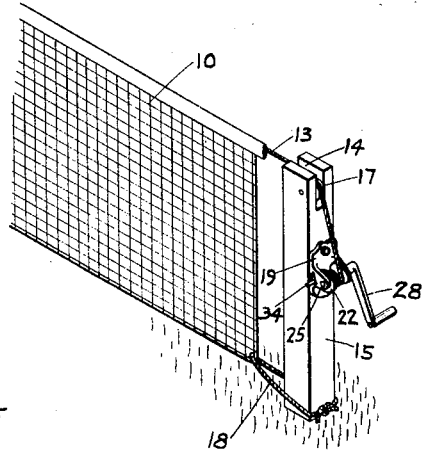
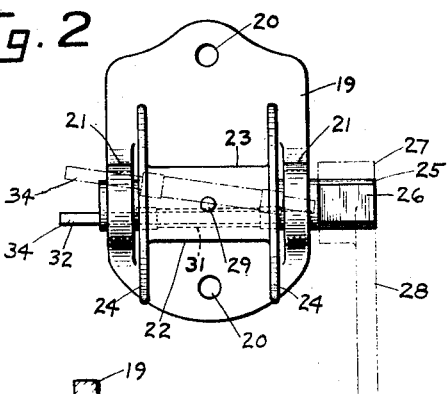
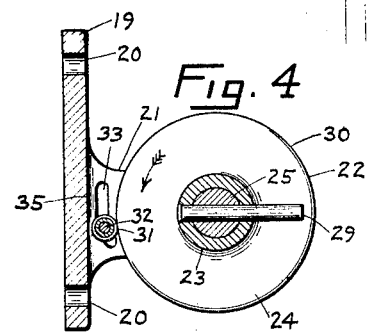
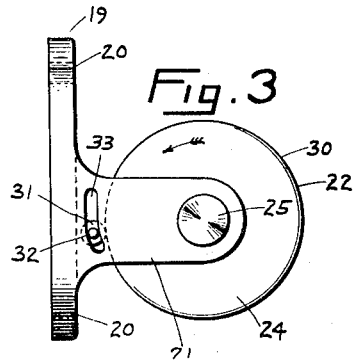
INVENTOR.
Manfred Johnson
BY
ATTORNEY Patented Dec. 19, 1933

1,940,595

UNITED STATES PATENT OFFICE 1,940,595

GAME NET SUPPORT

Manfred J. Johnson, Naugatuck, Conn., assignor to The Lewis Engineering Company, Naugatuck, Conn., a corporation of Connecticut Application August 22, 1931. Serial No. 558,682

6 Claims. (Cl. 254—162)

This invention relates to tennis net supports, and more particularly, to improved means for tightening the net in playing position.

An object of this invention is to provide a tennis net reel or winch which will hold the net just as taut as desired.

Heretofore, the reel was provided with an exposed ratchet wheel and pawl for holding it against unwinding movement. However, the pawl and ratchet could not stop the reel in every desired position, but only where the ratchet teeth and pawl happened to engage. Hence when the net was made as tight as desired by operation of a crank attached to the reel, release of the crank usually allowed the reel to unwind an amount depending upon the location of the ratchet tooth nearest to the pawl or dog. The ratchet teeth to be sufficiently strong and positive had of necessity to be of considerable width, and accordingly retrograde movement of the reel might be enough, depending on chance, to allow the net to undesirably sag.

Moreover the relatively sharp teeth of the ratchet wheel being exposed so that the pawl could be lifted therefrom in slackening the net and removing it presented a danger to players who might inadvertently strike the hand against the ratchet wheel in play or in tightening or loosening the net.

These disadvantages are obviated by the present invention by eliminating the ratchet wheel and pawl and providing a brake device acting directly on one or as is preferred both flanges of the reel. This brake device is universal in its braking action and prevents any perceptible retrograde movement of the reel or slackening of the net when the reel-crank is released. Yet, the brake device is instantly releasable by hand whenever desired.

The reel flanges being smooth are not liable to injure persons tightening or loosening the net and this is an important feature since the reel may rotate very fast immediately upon being released and if it contained ratchet teeth as heretofore might seriously injure the user's hand should it come into contact with the same.

Other features and advantages will hereinafter appear.

In the accompanying drawing which illustrates one form of this invention, that at present preferred—

Figure 1 is a perspective view of a tennis net and its supporting posts showing the device of the present invention applied to one of these posts.

Fig. 2 is a front view of the improved reel of the present invention, showing, in dot-and-dash lines, the locking roller canted upwardly to release the reel for unwinding movement.

Fig. 3 is a side elevation of the reel.

Fig. 4 is a central sectional view of the reel.

Fig. 5 is a longitudinal sectional view of the locking roller.

In the accompanying drawing, there is illustrated a net 10 which as shown is arranged for playing tennis but it is, of course, within the scope of this invention to use the net for other games. For instance, by mounting it higher above the ground it may be used for volley ball.

The net is shown as having an upper web 11 containing or attached to a rope or ropes 12 and 13 extending through notches 14 in supporting posts 15 which are embedded in the ground. The rope 12 is secured to a suitable fastening device such as a cleat, part of which is visible at the left side of Fig. 1 and is indicated by the reference numeral 16. The rope 13 preferably extends over a pulley 17 and extends down to a reel by means of which it may be pulled tight so that the webbing 11 and upper part of the net will not sag. The lower ends of the net are held against undesired movement by ropes 18.

Heretofore the rope 13 was wound on the reel having a ratchet wheel secured thereto and a back-check pawl engaging the ratchet wheel. When the net was tightened by winding the reel with a suitable crank, it could not always be locked in that position because some retrograde or unwinding movement usually occurred before the pawl engaged the next adjacent ratchet tooth allowing the net to sag. The spaces between these teeth had of necessity to be substantial, for it was necessary that the teeth be made quite heavy to withstand the strain.

According to the present invention, the reel is self-acting to lock immediately upon the completion of the tightening operation and thus keep the net from sagging.

The reel of the present invention comprises a frame 19 provided with holes 20 to receive lag screws or the like by means of which it is fastened to the post 15. The frame has a pair of outwardly extending arms 21 carrying a reel 22. The reel has a core 23 and side flanges 24 and a shaft 25 journalled in the arms 21. One end of the shaft has a flattened portion 26 to removably receive a similarly shaped hub 27 of a crank 28. The core 23 and shaft 25 are coupled for rotation by a pin 29 which also forms the hook to which a loop on the end of the rope 13 is applied.

Rotation of the shaft 25 by the crank 28 causes the reel to be moved and the rope 13 to be wound thereon.

The peripheries 30 of the reel flanges 24 are smooth and hence there is no danger of the players or the attendant being injured by inadvertently striking the reel as would be the case if one flange of the reel was provided with ratchet teeth.

To hold the reel against unwinding movements, the present invention provides a self-setting device acting on the periphery of one or both reel flanges 24 upon the slightest tendency of the reel to unwind to grip the same and prevent such unwinding movement. This device, in the form of the invention shown herein, comprises a roller 31 having a pin 32 extending therethrough and also located in slotted bearings 33 in the side arms 21. The bearings 33 at their lower ends slope downwardly and outwardly toward the reel flanges so that as the reel tends to rotate in the direction of the arrow shown in Fig. 4, the roller will be jammed between the peripheries of the flanges and the slotted bearings 33 because the space which the roller may occupy between peripheries of the flanges and the slots decreases as the roller moves down.

The pin 32 on the roller 31 normally rides in the slotted bearings 33 and hence the roller, being urged down normally by gravity, constantly tends to have intimate contact with the peripheries 30 of the flanges. Therefore, when the reel is being rotated by the crank 28 to tighten the upper edge of the net, the roller 31 merely rides up and away from the flanges. Upon the release of the reel by the user, however, the roller is immediately dragged down by the peripheries of the flanges to locking position and no perceptible unwinding motion of the reel occurs before the roller takes hold.

When it is desired to release the reel for unwinding movement, it is merely necessary to lift one end of the roller as to the dot-and-dash line position shown in Fig. 2, by means of the extension 34 of the pin 32 which forms a handle for this purpose. During the continued unwinding movement which is very rapid because the rope and webbing 11 are under substantial tension, the roller may be held in inoperative position shown in dot-and-dash lines in Fig. 2 by hand.

There is no possibility of the operator's hand being injured in the unwinding or winding movement of the reel because the peripheries of the reel are perfectly smooth, and the roller is located in an inaccessible position back of the reel.

It is within the scope of this invention to have the roller so proportioned as to jam between the peripheries 30 of the reel flanges and the front surface 35 of the frame 19; but it is preferable to have the roller mounted in the slotted bearings 33, for in this case only the bearings need to be smoothed-up while the surface 35 can be a roughed case surface without machine operations.

The pin 32 forming the trunnions for the roller 31 and also forming the handle 34 has preferably a drive fit with the roller so as to be permanently fixed thereto to turn with the roller.

In the broader aspects of this invention, it is not necessary that the roller engage both flanges 24 of the reel, for it would suffice to have either one of the two ends of the roller do so. By having both ends of the roller acting, it is positively assured that the flanged reel will be securely and quickly gripped.

Variations and modifications may be made within the scope of this invention and portions of the improvements may be used without others.

Having thus described the invention, what is claimed as new and for which it is desired to obtain Letters Patent, is:—

1. Means for tightening and supporting a tennis net between supporting posts comprising a frame secured to one of the posts and having outwardly extending arms; a reel rotatably mounted in the arms of the frame and having a pair of flanges; slotted bearings in said outwardly extending arms; and a roller mounted in said slotted bearings in the arms of the frame and adapted to engage the peripheries of the reel flanges, the slotted bearings for the roller being so located that the roller is wedged between the reel flanges and the slotted bearings upon tendency of the reel to unwind and locks the reel against unwinding as a result of said wedging action.

2. Means for tightening and supporting a tennis net between supporting posts comprising a frame secured to one of the posts and having outwardly extending arms; a reel rotatably mounted in the arms of the frame and having a pair of flanges; slotted bearings in said outwardly extending arms; and a roller mounted in said slotted bearings in the arms of the frame and adapted to engage the peripheries of the reel flanges, the slotted bearings sloping downwardly toward the periphery of the reel flanges causing the roller to be urged against the flanges by gravity and causing the roller to wedge between the bearings and the reel flanges upon tendency of the reel to unwind, said wedging action causing the reel to be locked against unwinding movement.

3. Means for tightening and supporting a tennis net between supporting posts comprising a frame secured to one of the posts and having outwardly extending arms; a reel rotatably mounted in the arms of the frame and having a pair of flanges; slotted bearings in said outwardly extending arms; a roller mounted in said slotted bearings in the arms of the frame and adapted to engage the peripheries of the reel flanges, the slotted bearings sloping downwardly toward the periphery of the reel flanges causing the roller to be urged against the flanges by gravity and causing the roller to wedge between the bearings and the reel flanges upon tendency of the reel to unwind, said wedging action causing the reel to be locked against unwinding movement; and an extension on said roller reaching beyond the adjacent arm of the frame by means of which the roller may be released from operative positions and held in inoperative position.

4. Means for tightening a tennis net between supporting posts comprising a frame adapted to be fixed to one of the posts; a reel rotatably mounted in the frame; a self-setting frictional device consisting of a roller supported in slotted bearings in the frames acting on the reel to lock the reel against unwinding movements; and an extension on said device adapted to be grasped manually and moved to unlock the reel for unwinding movement.

5. Means for tightening a tennis net between supporting posts comprising a frame adapted to be fixed to one of the posts; a reel rotatably mounted in the frame; a self-setting frictional device acting on the reel and on the frame to lock the reel against unwinding movements; and manually operable means integral with said frictional device and extending outside said frame to release said device from locking position and to hold it in such position.

6. Means for tightening a tennis net between supporting posts comprising a frame adapted to be fixed to one of the posts; a reel rotatably mounted in the frame, said reel having a pair of flanges forming the sides thereof; a self-setting roller acting on the flanges of the reel to frictionally grip the same and lock the reel against unwinding movement; and an extension on one end of said roller whereby the roller may be manually canted upwardly to release its grip on the flanges and release the reel for unwinding movement.

MANFRED J. JOHNSON.